United States Patent
Cheenne-Astorino et al.

[11] Patent Number: 5,821,459
[45] Date of Patent: Oct. 13, 1998

[54] POWER CABLE SPLICE

[75] Inventors: Annie Cheenne-Astorino, Merchtem; Christophe Brackeniers, Aalst; Johan Cauwel, Moorsel, all of Belgium

[73] Assignee: Alcatel Cable France, Cedex, France

[21] Appl. No.: 793,514

[22] PCT Filed: Jun. 24, 1996

[86] PCT No.: PCT/FR96/00985

§ 371 Date: Feb. 25, 1997

§ 102(e) Date: Feb. 25, 1997

[87] PCT Pub. No.: WO97/01880

PCT Pub. Date: Jan. 16, 1997

[30] Foreign Application Priority Data

Jun. 27, 1995 [FR] France .................................. 95 07725

[51] Int. Cl.⁶ ....................... H02G 15/064; H02G 15/184
[52] U.S. Cl. ................. 174/73.1; 174/75 B; 174/DIG. 8
[58] Field of Search ............................... 174/73.1, 74 A, 174/74 R, 75 R, 75 B, DIG. 8

[56] References Cited

U.S. PATENT DOCUMENTS

| | | | |
|---|---|---|---|
| 3,412,200 | 11/1968 | Virsberg et al. | 174/120 R X |
| 3,673,311 | 6/1972 | Misare | 174/73.1 |
| 3,692,922 | 9/1972 | Sugimoto et al. | 174/73.1 |
| 3,717,717 | 2/1973 | Cunningham et al. | 174/73.1 |
| 3,777,048 | 12/1973 | Traut | 174/73.1 |
| 3,952,604 | 4/1976 | Penneck | 174/73.1 X |
| 4,164,620 | 8/1979 | Hervig | 174/73.1 |
| 4,487,994 | 12/1984 | Bahder | 174/73.1 |
| 4,698,458 | 10/1987 | Parmigiani et al. | 174/73.1 |
| 5,043,538 | 8/1991 | Hughey, Jr. et al. | 174/108 X |

FOREIGN PATENT DOCUMENTS

| | | |
|---|---|---|
| 1506146 | 12/1967 | France . |
| 2436519 | 4/1980 | France . |
| 2593335A1 | 7/1987 | France . |
| 21 49 229 | 6/1985 | United Kingdom . |

Primary Examiner—Dean A. Reichard
Attorney, Agent, or Firm—Sughrue, Mion, Zinn, Macpeak & Seas, PLLC

[57] ABSTRACT

The power cable splice includes two cables, the stripped respective end portions of which are interconnected by a metal connector and are covered by a splice body and by electrical shielding. The splice further includes a flexible composite plate including a first layer that is semiconductive, and a second layer that is not electrically conductive, the plate being wrapped around the connector and around the ends of the stripped insulation of the cables, with the semiconductive layer of the plate being in contact with the connector.

18 Claims, 1 Drawing Sheet

POWER CABLE SPLICE

The present invention relates to a power cable splice.

BACKGROUND OF THE INVENTION

A medium-voltage or high-voltage electrical power cable includes a conductor, insulation on the conductor, a semiconductive screen, a metal screen, and an outer sheath.

In order to splice together two such power cables, an end portion of each of them is prepared so as to strip the semiconductive screen, the insulation, and the conductor in successive steps and over suitable lengths, with the metal screen itself optionally being stripped. The stripped conductors are then electrically and mechanically connected together by means of a connector. Over the end portions of the cables, the removed screens and the usually removed outer sheath are reconstituted by means of firstly a splice body surrounding the connector and extending on either side thereof, secondly electrical shielding on the splice body, and optionally thirdly an outer protection that covers the electrical shielding and that extends over the end of the outer sheath of each cable.

Splices implemented in this way are disclosed in particular in Documents FR-A-2 436 519 and U.S. Pat. No. 4,742,184. In such a known splice, the splice body is a tubular element comprising at least two layers formed by an insulating main layer and a semiconductive outer layer.

In the splice disclosed in Document FR-A-2 436 519, the splice body is shrink-fittable, and in particular heat-shrinkable. It may include a voltage-gradient inner layer which is semiconductive or has non-linear electrical resistivity characteristics, or which includes a fluid coating such as a mastic. Furthermore, before the splice body is installed, the space adjacent to the stripped and interconnected conductors may be provided with a filler material which may be a silicone grease, a mastic, or a meltable glue, and may have insulating, conductive, or semiconductive properties, for filling any voids that remain under the splice body as installed, so as to minimize the risks of insulation breakdown due to the air in certain voids ionizing.

In the splice disclosed in Document U.S. Pat. No. 4,742,184, the splice body includes a semiconductive inner layer, and the electrically interconnected cables are provided firstly with a split semiconductive elastomer tube mounted on the connector, and secondly with an insulating elastomer tube mounted on the stripped insulation of each of the cables. The tubes adapt the outside diameter of the cables to fit the inside diameter of the splice body. Accordingly, they are chosen as a function of the cables used and/or of the connector used, so as to couple the layers of the splice body to the corresponding layers of the cables. The semiconductive elastomer tube also co-operates with the semiconductive inner layer of the splice body to place outside the influence of the electric field any air gaps between the splice body and the stripped and interconnected conductors. The semiconductive inner layer extends for this purpose along the semiconductive elastomer tube and over the facing end of each of the two insulating tubes.

Installing those known means for minimizing the risk of insulation breakdown in power cable splices is time-consuming and/or difficult or sometimes even dangerous when a flame is used for shrinking the heat-shrinkable splice body, and, once installed, they may be moved, or removed in part during installation of the splice body when said splice body is mechanically shrink-fittable.

SUMMARY OF THE INVENTION

An object of the invention is to provide means that avoid those problems, that are very easy and quick to install, that are adapted to any type of connector and to any type of cable, and that significantly improve the breakdown strength of the splice.

The invention provides a power cable splice including:

two cables, each of which comprises a conductor, insulation, a semiconductive screen, a metal screen, and an outer sheath, and has an end portion that has been stripped in successive steps;

a metal connector interconnecting the stripped conductors;

means that are electrically conductive at least in part and that surround said connector;

a tubular splice body surrounding said means and extending over the ends of the stripped insulation of the cables; and electrical shielding surrounding the splice body and electrically connected to the metal screens of the cables;

said splice being characterized in that said means are constituted by a flexible two-layer composite plate which comprises a first layer of at least semiconductive material, and a second layer of a material that is not electrically conductive, and which has a length not less than the length of the stripped and interconnected conductors, and a width not less than the peripheral length of said connector, said plate being laid along and wrapped around said connector with said first layer being in contact with the connector.

The splice advantageously has at least one of the following additional characteristics:

said composite plate is made up of a semiconductive elastomer plate defining said first layer, and of a mastic plate defining said second layer, the two plates being mutually superposed and secured to each other;

said composite plate is extruded;

the length of said composite plate is significantly longer than that of the stripped and interconnected conductors, and said plate is wrapped over the ends of the stripped insulation of the cables;

the first layer has at least one of its dimensions smaller than the corresponding dimension of said second layer;

the splice further includes a strip made of an adhesive material and associated with said composite plate for fixing it along said connector;

said splice body includes an insulating main layer, a semiconductive outer layer, and optionally a voltage-gradient continuous inner layer made of a material having high permittivity; and said splice body is a mechanically shrink-fittable element.

BRIEF DESCRIPTION OF THE DRAWING

The characteristics and advantages of the present invention appear from the following description of a preferred embodiment given by way of example and with reference to the accompanying drawing, in which.

DETAILED DESCRIPTION OF THE PREFERRED EMBODIMENTS

Figure 1:
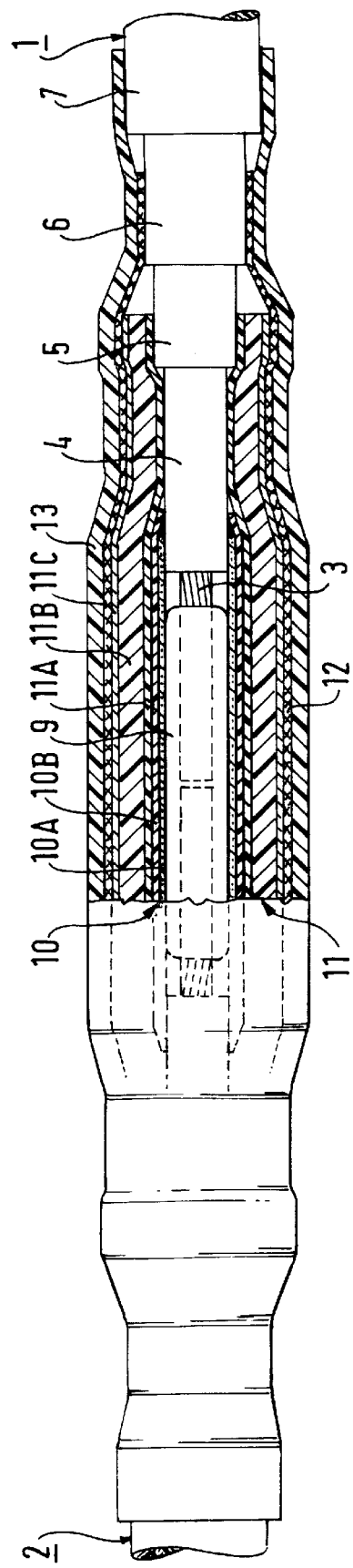
FIG. 1 is a view partially in section and partially in elevation of a splice according to the invention whereby two power cables are spliced together.

As shown in FIG. 1, the power cable splice includes two medium-voltage or high-voltage cables 1 and 2, whose respective end portions are stripped, connected together, and equipped so that they are functionally reconstituted.

As shown and referenced on cable 1 only, each cable comprises a central conductor 3, insulation 4 surrounding the conductor, optionally with a semiconductive layer being disposed therebetween, a semiconductive screen 5 on the insulation, a metal screen 6 on the semiconductive screen, and a protective outer sheath 7. The cable end portions to be connected together are stripped in successive steps by successively removing suitable lengths of the outer sheath, of the screens, and of the insulation, with the metal screen optionally not being stripped relative to the outer sheath.

A metal connector 9 of any suitable type electrically and mechanically interconnects the two stripped conductors of the cables.

The splice including the two cables interconnected in this way also includes a flexible composite plate 10 which surrounds the connector 9 and extends along the connector and over the end of the stripped insulation of each cable, a splice body 11 which surrounds the composite plate as installed and extends over the end of the semiconductive screen of each cable, electrical shielding 12 which covers the splice body and is electrically connected to the metal screens of the cables, and, preferably and as shown, outer protection 13 which then covers the shielding and extends over the ends of the sheaths of the cables.

The composite plate 10 comprises two layers, namely a layer of material that is semiconductive or conductive 10A, and a layer of material that is not electrically conductive 10B, the layers being mutually superposed and secured to each other. Layer 10A is preferably made of a semiconductive elastomer material and formed by a plate made of such material. Layer 10B is advantageously formed by a plate made of mastic, preferably having high permittivity, i.e. approximately equal to or greater than 6, that adheres directly to the semiconductive plate 10A. Later 10B may be made of an elastomer that is a very good electrical insulator, in which case the composite plate may be obtained by co-extruding its two layers.

The flexible composite plate 10 is wrapped around the connector 9 and the stripped end of the insulation of each cable, with its semiconductive layer 10A pressed against the connector and in intimate electrical contact therewith. Provision is made for the plate to be of length equal to or slightly greater than the overall length of the two stripped and interconnected conductors of the cables. Provision is also made for it to be of width equal to or greater than the peripheral length of the connector 9 used, and advantageously of any other connector that could be used for the two cables or for other cables, so as to be wrapped through at least one full turn around the connector interconnecting the cables in question. The dimensions of the composite plate are defined by those of its layer 10B.

In this embodiment, the splice body 11 is a three-layer tubular element comprising a voltage-gradient inner layer 11A, an insulating intermediate main layer 11B, and a semiconductive outer layer 11C, each layer being of uniform thickness, and the three layers being of the same length and advantageously co-extruded. The voltage-gradient inner layer 11A is preferably made of an elastomer having high permittivity.

In a variant, the splice body is two-layer and comprises the above-mentioned insulating main layer and the above-mentioned semiconductive outer layer only.

The splice body 11 is radially deformable, and it is preferably mechanically shrink-fittable.

The electrical shielding 12 is also a tubular element which is formed by resilient metal trellis-work. The outer protection 13 is a resilient insulating elastomer sleeve, and it is preferably mechanically shrink-fittable. The electrical shielding and the outer protection are advantageously pre-assembled in the factory so that they form an assembly with the splice body, which assembly can be directly installed on site on the cables as interconnected and equipped with the plate 10 around the connector.

Figure 2:
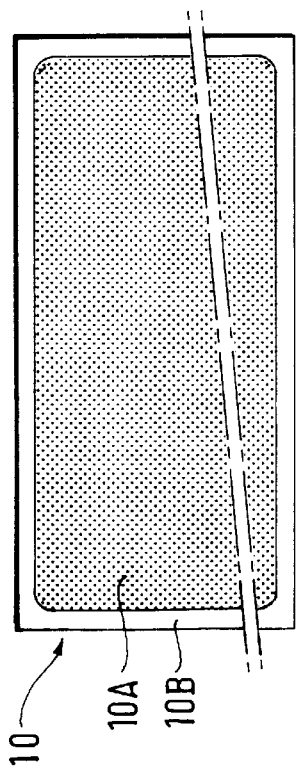
FIG. 2 is a view of a composite plate of the splice, the plate being shown in the deployed state before it is installed.

An embodiment of the two-layer plate 10 is shown in FIG. 2, the plate being shown before it is installed in the splice. The layer of non-conductive material 10B is constituted by a mastic plate, and the layer of semiconductive material 10A is constituted by a plate made of elastomer that has been rendered semiconductive, the two plates being mutually superposed and secured to each other directly. The corners of the semiconductive plate are cut off so as to be substantially rounded.

As shown in FIG. 2, provision is made for the mastic plate 10B to be slightly wider and longer than the semiconductive plate 10A. This facilitates installation of the composite plate 10 around the connector, by enabling it to be retained initially via one of its longitudinal edges made entirely of mastic, or via its only longitudinal edge made entirely of mastic, which edge adheres directly to the connector and to the stripped ends of the insulation of the cables, so that it can then be wrapped more easily around the connector and the insulation. Said edge is deformable and flattened out longitudinally so as to prevent a stepped transition from forming on the connector. The other longitudinal edge of the composite plate is also advantageously made entirely of mastic so as to be flattened out, thereby likewise preventing another stepped transition from forming along the outside of the composite plate as installed. The two end edges of the composite plate are also preferably defined by those of the mastic plate 10B only, so as to be flattened out over the ends of the insulation of the cables, thereby defining gradual transitions between the stripped insulation of the cables and the composite plate as installed.

The width of the semiconductive plate 10A may be considerably smaller than that of the mastic plate 10B, while nevertheless remaining larger than the overall width of one or more longitudinal zones containing depressions on the periphery of the connector, so as to cover entirely and extend beyond the zone(s). The semiconductive plate is not necessarily centered over the width of the mastic plate 10B.

In a variant relative to FIG. 2, the edges of the mastic plate and the edges of the superposed semiconductive plate are in register with one another. In which case, one of the longitudinal edges of the composite plate may be folded inwards, or an adhesive strip may be used so as to enable the edge to be retained on the connector and on the stripped ends of the insulation of the cables, thereby making it easier to wrap the composite plate around them.

When the composite plate is formed of two co-extruded layers, an adhesive strip or a bead of glue may be used at the beginning or at the end of installation of the composite plate, for retaining one of the longitudinal edges on the connector and on the stripped ends of the insulation of the cables, and for maintaining the plate as installed wrapped therearound.

Figure 3:
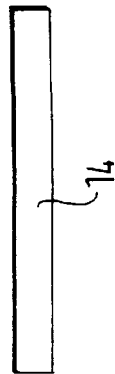
FIG. 3 shows a strip of adhesive material, advantageously also used in the splice of the invention.

FIG. 3 shows a strip of adhesive material 14, preferably made of adhesive ordinary mastic, and serving to fix the above-mentioned composite plate along the connector. Preferably, the strip is also used to fill any deep depressions on the connector used. It is then laid along such depressions and it is covered by the semiconductive layer of the composite plate which is fixed to the strip for the purposes of fixing the composite plate, and which is wider and longer than the strip so as to cover the strip entirely, and so as also to be in direct contact with the connector at least all around the strip and around any underlying voids that might remain at the depressions.

In the splice shown in FIG. 1, the composite plate 10 is wrapped around the connector through a single full turn with its longitudinal edges overlapping. Its outer plate or layer of material that is not electrically conductive 10B thus finds itself interposed between the splice body 11 and the inner plate or layer of material that is semiconductive 10A. It makes it possible both to avoid any air bubbles extending between the splice body and the inner plate or layer of semiconductive material 10A, and also to reduce the electrical stresses at the ends of the inner plate or layer of semiconductive material 10A.

In addition to being easy and quick to install, the composite plate offers the advantage of requiring no tool for fitting it, and thereby avoiding any extra cost or risk of damaging the cables, or other dangers.

Provision is made for the composite plate to be wide enough to fit directly over various interconnected cable sections, and over various types of connector, in particular crimpable or boltable types, that might be used, by its longitudinal edges overlapping to various extents, or by it being wrapped through a plurality of turns around the connected used.

The same composite plate also makes it possible for an extruded splice body to be used that has no semiconductive inner layer which, when it is present, is removed along the end portions of the body and remains over its middle portion only. Furthermore, such a composite plate, whose layer of non-conductive material is constituted by a layer of mastic, is very well suited to being associated with a mechanically shrink-fittable splice body, or with the pre-assembled assembly that it forms with the electrical shielding and the outer protection, which body or assembly can be installed without using a flame which could soften the mastic and then cause it to crack subsequently.

Independently of the above advantages, the splice of the invention makes it possible to achieve a very substantial improvement in breakdown strength. This can be shown by the test results given which express the partial discharge levels prior to heating cycles in splices of the invention, and in splices that are comparable except that each of them includes a semiconductive tube or a high-permittivity mastic around the connector, instead of the composite plate.

In particular, these partial discharge levels, as expressed in picocoulombs remain greater than 500 pC at 21 kV when a semiconductive tube is used around a crimped connector, and remain greater than 30 pC at 21 kV and greater than 50 pC at 24 kV when a high-permittivity mastic is used around the same connector, but they are less than 5 pC at 21 kV and less than 10 pC at 24 kV when said composite plate is used around the connector. With a bolted connector, the levels remain greater than 1,000 pC at 21 kV, when a semiconductive tube is used around the connector, and they are reduced to less than 10 pC at 24 kV and to less than 5 pC at 21 kV when the composite plate is used.

What is claimed is:

1. A power cable splice comprising:

two cables, each of which comprises a conductor, insulation, a semiconductor screen, a metal screen, and an outer sheath, and has an end portion that has been stripped in successive steps;

a metal connector interconnecting the stripped conductors;

a flexible two-layer composite plate which comprises a first layer of at least semiconductive material, and a second layer of a material that is not electrically conductive, and which has a length not less than the length of the stripped and interconnected conductors, and a width not less than a peripheral length of said connector, said plate being laid along and wrapped and maintained around said connector with said first layer being in contact with the connector;

a tubular splice body surrounding said composite plate around said connector and extending on both sides over the stripped insulation of the cables; and electrical shielding surrounding the splice body and electrically connected to the metal screens of the cables.

2. A splice according to claim 1, wherein said composite plate is an extruded composite plate.

3. A splice according to claim 1, further including a strip made of an adhesive material and associated with said composite plate for fixing it along said connector.

4. A splice according to claim 3, wherein said strip is laid along external depressions in said connector, and it is covered by said first layer of the composite plate, said first layer having dimensions that are larger than those of said strip.

5. A splice according to claim 1, wherein said splice body includes an insulating main layer and a semiconductive outer layer.

6. A splice according to claim 5, wherein said splice body further includes a voltage-gradient continuous inner layer made of a material having high permittivity.

7. A splice according to claim 5, wherein said splice body is a mechanically shrink-fittable element.

8. A splice according to claim 7, wherein said splice body and said electrical shielding are constituted by a preassembled assembly that is mechanically shrink-fittable.

9. A power cable splice comprising:

two cables, each of which comprises a conductor, insulation, a semiconductor screen, a metal screen, and an outer sheath, and has an end portion that has been stripped in successive steps;

a metal connector interconnecting the stripped conductors;

means that are electrically conductive at least in part and that surround said connector;

a tubular splice body surrounding said means and extending over the ends of the stripped insulation of the cables; and electrical shielding surrounding the splice body and electrically connected to the metal screens of the cables, wherein said means are constituted by a flexible two-layer composite plate which comprises a first layer of at least semiconductive material, and a second layer of a material that is not electrically conductive, and which has a length not less than the length of the stripped and interconnected conductors, and a width not less than a peripheral length of said connector, said plate being laid along and wrapped around said connector with said first layer being in contact with the connector, and wherein said composite plate is made up of a semiconductive elastomer plate defining said first layer, and of a mastic plate defining said second layer, the two plates being mutually superposed and secured to each other.

10. A splice according to claim 9, wherein said second layer defines the dimensions of said composite plate, and its length is significantly longer than that of the stripped and interconnected conductors.

11. A splice according to claim 9, wherein said first layer has at least one of its dimensions smaller than a corresponding dimension of said second layer.

12. A splice according to claim 9, wherein said mastic plate is made of a mastic having high permittivity, at least about 6.

13. A splice according to claim 9, further including a strip made of an adhesive material and associated with said composite plate for fixing it along said connector.

14. A splice according to claim 13, wherein said strip is laid along external depressions in said connector, and it is covered by said first layer of the composite plate, said first layer having dimensions that are larger than those of said strip.

15. A splice according to claim 9, wherein said splice body includes an insulating main layer and a semiconductive outer layer.

16. A splice according to claim 15, wherein said splice body further includes a voltage-gradient continuous inner layer made of a material having high permittivity.

17. A splice according to claim 15, wherein said splice body is a mechanically shrink-fittable element.

18. A splice according to claim 17, wherein said splice body and said electrical shielding are constituted by a preassembled assembly that is mechanically shrink-fittable.

* * * * *